Figure 1:
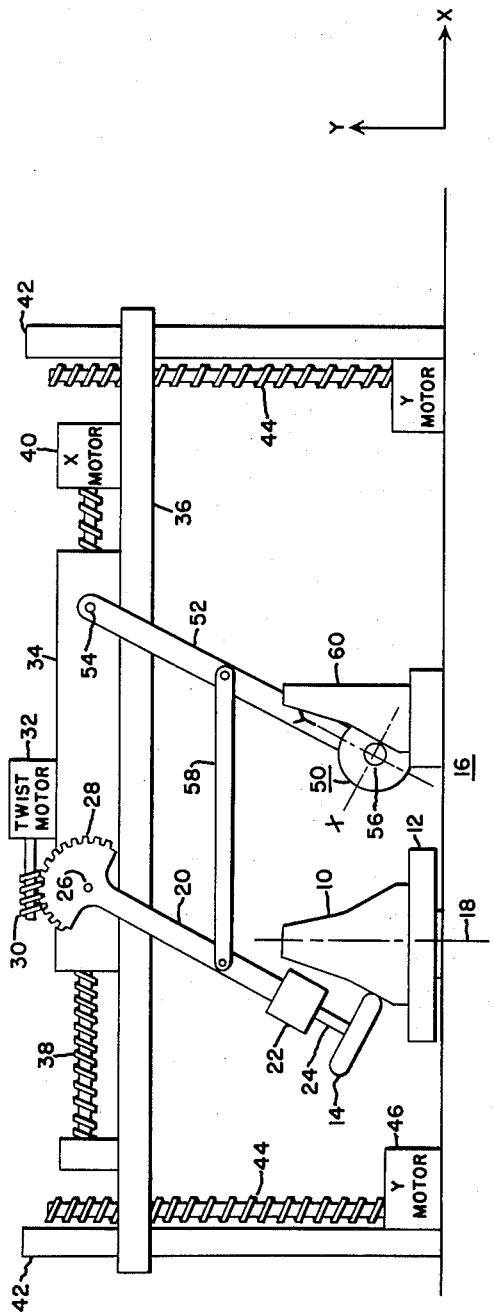

Nov. 6, 1962

G. G. ERTELL ETAL 3,062,996

TRACER CONTROL SYSTEM

Filed March 29, 1960

4 Sheets-Sheet 1

INVENTORS:
GLENN G. ERTELL,
JOHN M. RHOADES,

BY James G. Williams
THEIR ATTORNEY.

Nov. 6, 1962 G. G. ERTELL ETAL 3,062,996
TRACER CONTROL SYSTEM
Filed March 29, 1960 4 Sheets-Sheet 2

INVENTORS:
GLENN G. ERTELL,
JOHN M. RHOADES,

BY James G. Williams
THEIR ATTORNEY.

Nov. 6, 1962     G. G. ERTELL ETAL     3,062,996
                 TRACER CONTROL SYSTEM
Filed March 29, 1960                   4 Sheets-Sheet 4

INVENTORS:
GLENN G. ERTELL,
JOHN M. RHOADES,

BY *James G. Williams*
         THEIR ATTORNEY.

United States Patent Office 3,062,996
Patented Nov. 6, 1962

3,062,996
TRACER CONTROL SYSTEM
Glenn G. Ertell and John M. Rhoades, Waynesboro, Va., assignors to General Electric Company, a corporation of New York
Filed Mar. 29, 1960, Ser. No. 40,490
8 Claims. (Cl. 318—162)

The invention relates to a tracer control system, and particularly to a tracer control system that positions two objects in a desired relative orientation and that moves the two objects in a desired relative direction.

In the machine tool art, a tracing device has frequently been utilized with a control system to provide relative movement of a tool and workpiece along a path similar to the outline of a pattern or template which is followed by the tracing device. An example of such a tracing device and control system may be found in Patent No. 2,492,731 issued to Norman G. Branson on December 27, 1949. This tracing device comprises a stylus which generates a signal which is utilized by the control system to cause the tracing device to be moved along the outline of a pattern. As the tracing device moves, it causes a tool which is linked to it to move along a path similar to the outline of the pattern. However, in some tracing applications it may be desirable that a specific point or line on the tool always remain tangent to the path being followed. For example, where a workpiece is being ground, the forces applied to the grinding wheel will be within the stress limits of the wheel if the grinding surface of the grinding wheel is always tangent to the desired finished surface of the workpiece being ground. Thus, it may be desirable, if not necessary, that the tracing device and tool be provided with certain orientations as well as movements relative to a pattern and workpiece.

Accordingly, an object of the invention is to provide a tracer control system that orients the tracing device and tool.

Another object of the invention is to provide a tracer control system that permits relative orientation of two objects as well as relative movement of two objects.

The invention contemplates the use of a pivotable tool or device which is to be both moved and oriented with relation to a workpiece. A tracing device is provided for generating a first signal indicative of the desired relative movement, and means are coupled to the tracing device for effecting this movement in response to the first signal. Means are also provided for generating a second signal indicative of the desired relative orientation and for pivoting the pivotable tool to the desired orientation in response to the second signal. The means for generating the second signal may include a part of the tracing device, or may be separate means.

Figure 2A:
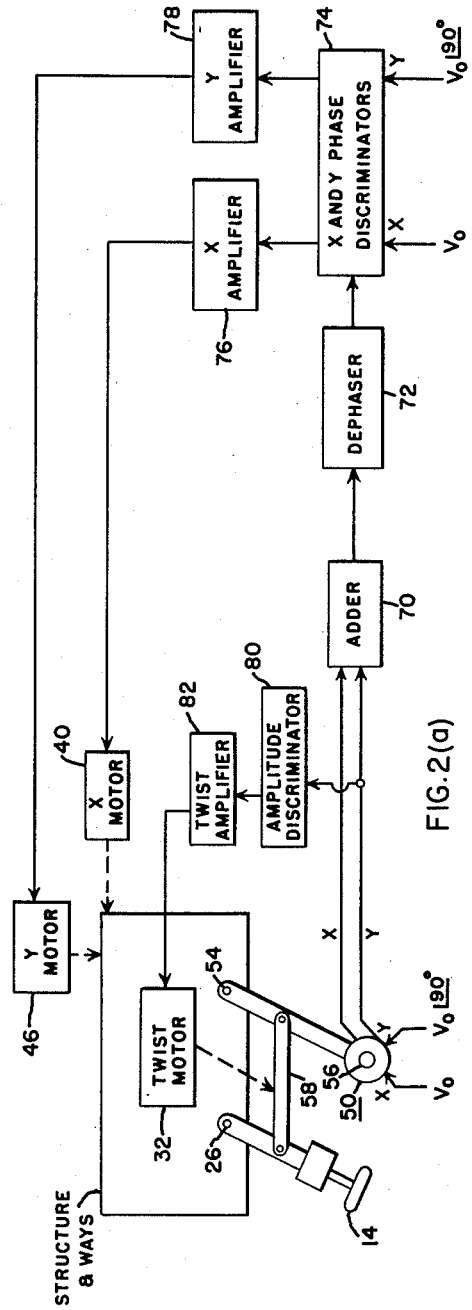
Figures 2B, 3:
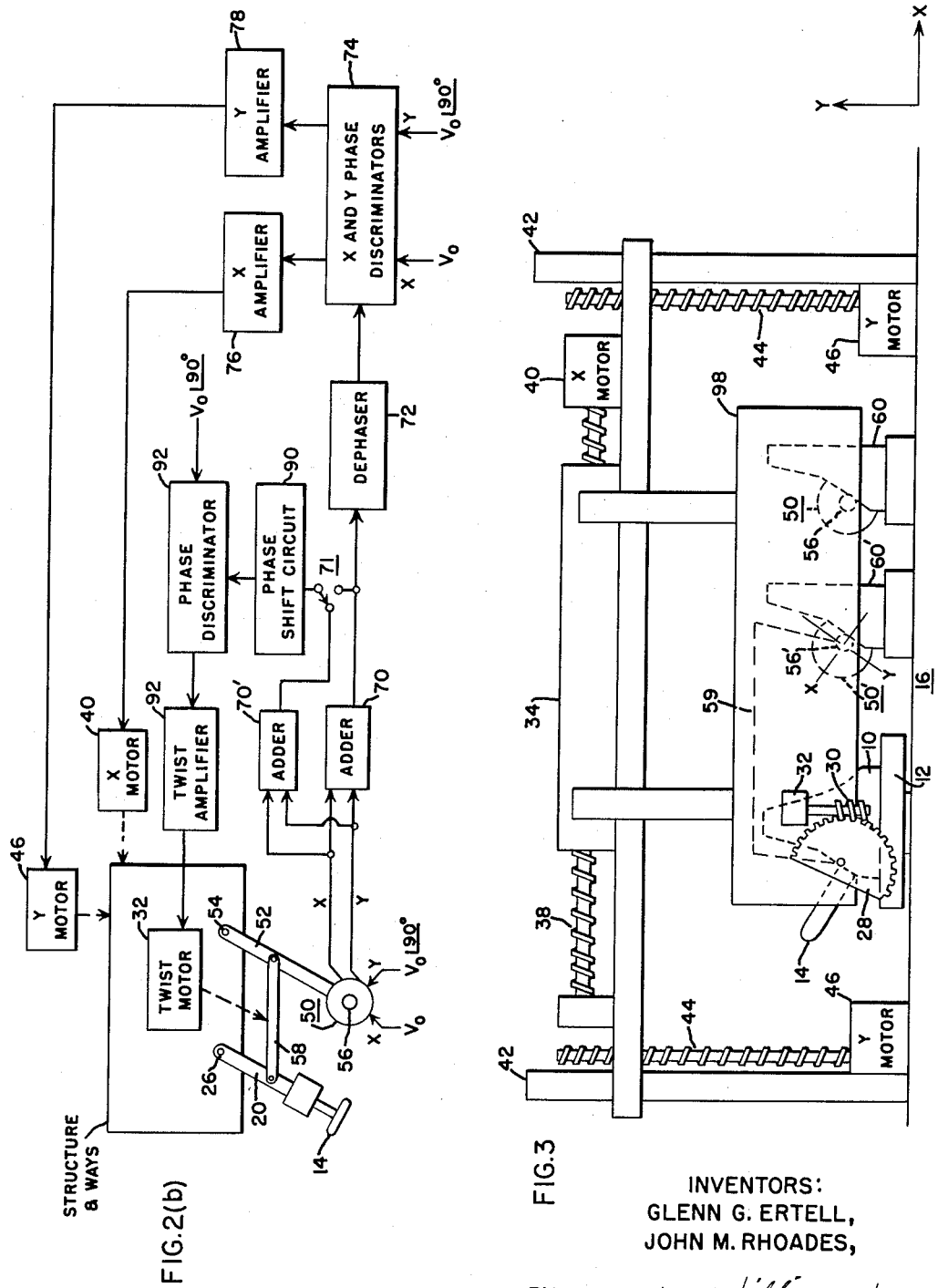
Figure 4:
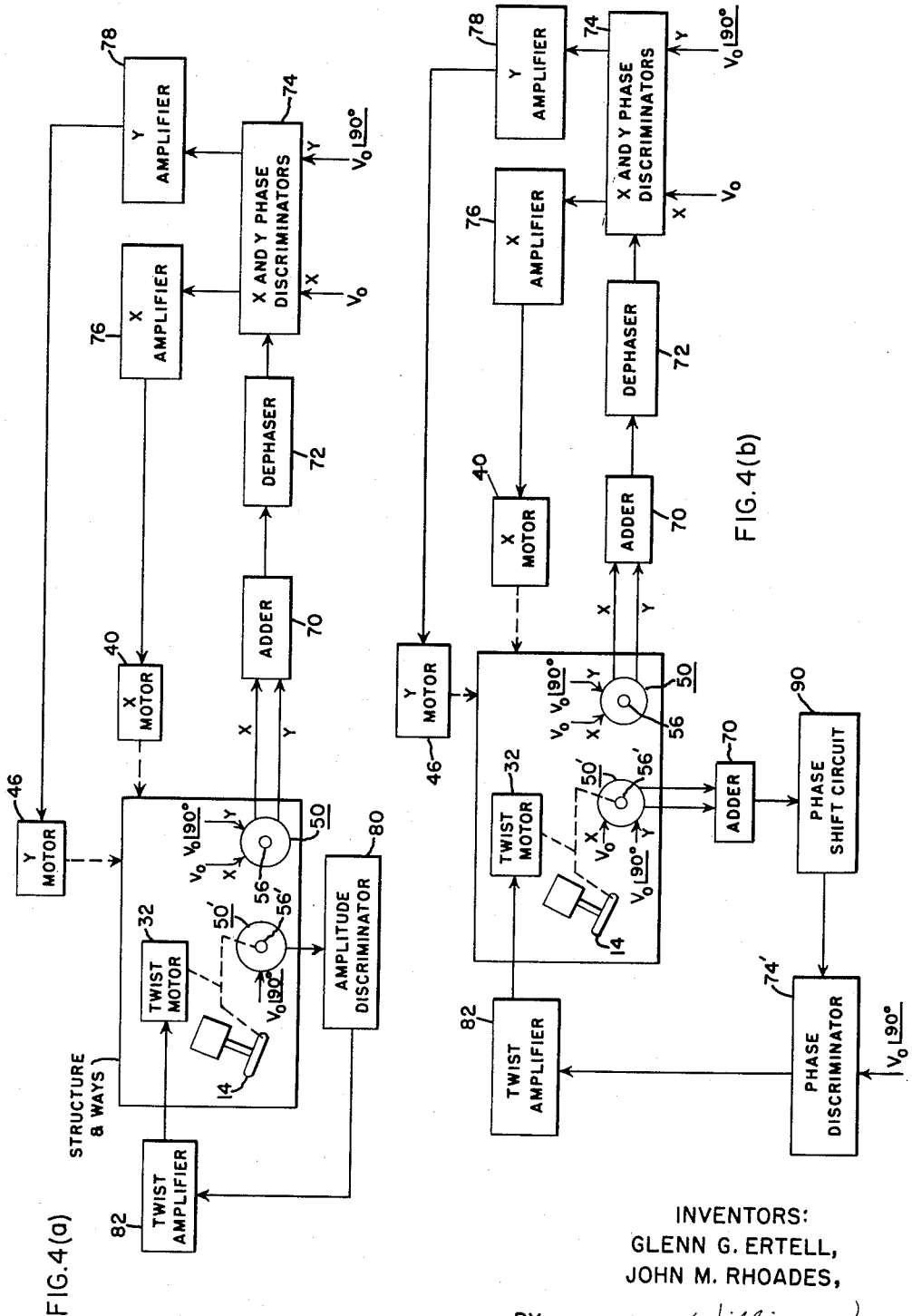
Figure 5:
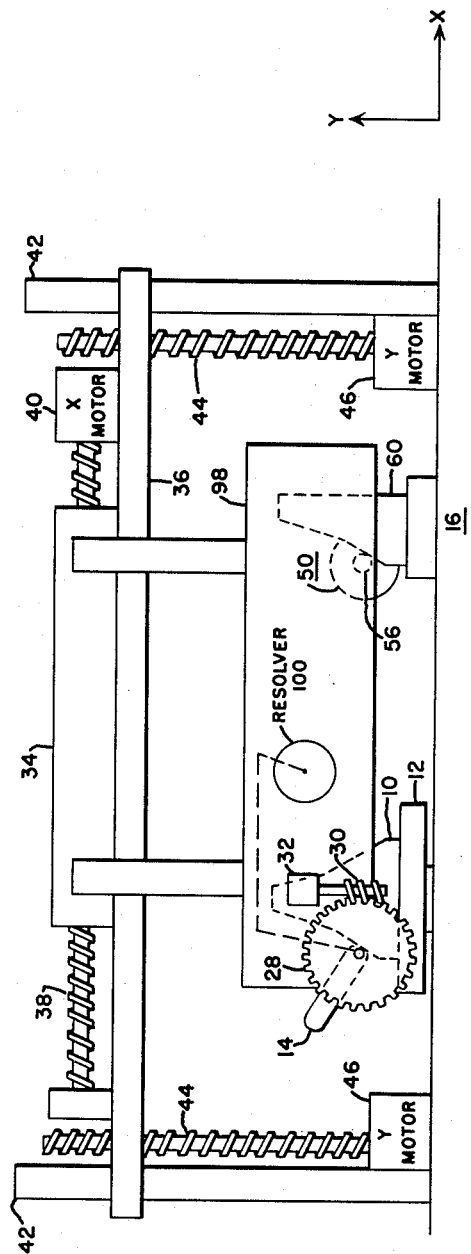
Figure 6:
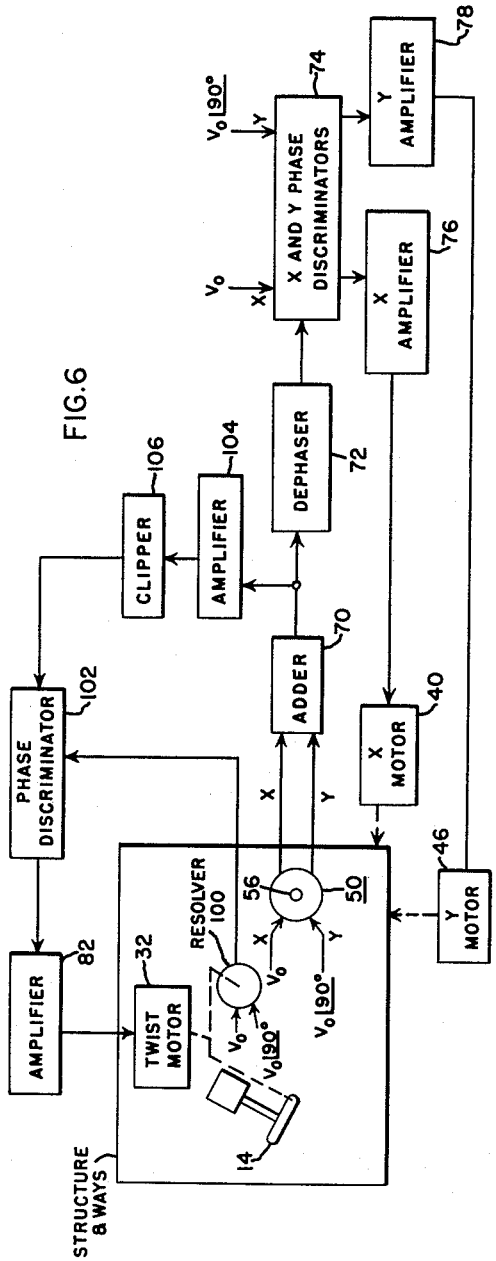

The invention may be better understood from the following description taken in connection with the accompanying drawing, and its scope will be pointed out in the claims. In the drawing:

FIGURE 1 shows an elevation view of one embodiment of the invention utilizing a single tracing device;

FIGURES 2(a) and 2(b) show alternative schematic block diagrams of the electrical circuitry associated with the embodiment of FIGURE 1;

FIGURE 3 shows an elevation view of another embodiment of the invention utilizing two tracing devices;

FIGURES 4(a) and 4(b) show alternative schematic block diagrams of the electrical circuitry associated with the embodiment of FIGURE 3;

FIGURE 5 shows an elevation view of an embodiment of the invention utilizing a single tracing device and a resolver; and FIGURE 6 shows a schematic block diagram of the electrical circuit associated with the embodiment of FIGURE 5.

In the drawing, the same reference numerals are used to refer to the same or similar elements or components. The embodiment shown in the various figures has been selected as a typical example of the application of the invention. In this example, it has been assumed that a workpiece 10 is rotated by suitable means such as a rotatable table 12 and is machined or ground by a rotating grinding wheel 14. It is to be understood however, that this is an example only, and is not to be construed as being a limitation on the application of the invention. With specific reference to FIGURE 1, the workpiece 10 is mounted on a rotating table 12, the rotating table 12 being mounted on a table or bed 16 so as to rotate about an axis 18. The grinding wheel 14 is mounted on a pivotable arm 20 that carries a motor 22 which drives the grinding wheel 14 by means of a shaft 24. The pivotable arm 20 is pivoted about a pivot point 26 by a worm wheel 28 which is driven by a worm gear 30. The worm gear 30 is rotated or operated by a twist motor 32. It will be seen that as the twist motor 32 operates, the worm gear 30 serves to cause the pivotable arm 20 to pivot about its pivot point 26 in a direction determined by the direction of rotation of the worm gear 30. The pivotable arm 20, its associated elements, and the twist motor 32 are all carried by a carriage 34 which slideably rests on a horizontal way 36. The carriage 34 is moved horizontally in a direction arbitrarily indicated to be the X direction by means of a horizontal lead screw 38 which engages a threaded portion (not shown) on the carriage 34, and which is suitably supported at its ends in bearings and driven or rotated by an X motor 40. The X motor 40 and the horizontal lead screw bearings are positioned on the horizontal way 36. The horizontal way 36 is suitably and slideably positioned on a pair of vertical ways 42, the vertical ways 42 being positioned on the bed 16. The horizontal way 36 and its associated elements are all moved vertically in a direction arbitrarily indicated to be the Y direction by means of vertical lead screws 44 which are positioned in suitable bearings and driven or rotated by one Y motor 46 if the lead screws 44 are mechanically linked, or by two Y motors 46 if not so linked. The vertical lead screws 44 engage threaded portions (not shown) on the horizontal way 36 and serve to raise and lower the horizontal way 36 and the associated elements carried by it.

A tracing device 50 (viewed from its end) is also pivotably mounted on the carriage 34 by a tracing arm 52. The tracing device 50 comprises a tracing stylus 56 which, when deflected along either or both of its indicated X and Y axes, provides electrical signals whose vector sum is indicative of the direction and magnitude of the deflection. These X and Y axes lie in a common plane which is parallel to the X and Y directions of motion. Such a device as the tracing device 50 is explained in detail in the patent to Branson. The tracing arm 52 is linked in parallelogram fashion to the pivot arm 20 by any suitable means such as a link 58. The tracing arm 52 and the pivot arm 20 are preferably identical to one another in dimensions and configuration so that when linked together by the link 58, movement of the tracing stylus 56 causes substantially identical movement of a predetermined point on the grinding wheel 14. Thus, movement of either the tracing arm 52 or the pivot arm 20 causes similar movement of the other arm in the same plane or in parallel planes which are parallel to the arbitrarily assigned X and Y directions.

A pattern or template 60 is provided and is given a configuration or surface which is similar to the configuration or surface to be reproduced in the workpiece 10. The pattern 60 is mounted with respect to the X and Y directions and with respect to the location of the workpiece 10 so that motion of the tracing stylus 56 along the surface of the pattern 60 produces corresponding motion of the grinding wheel 14 along the desired surface or configuration of the workpiece 10.

It has already been mentioned that in some applications, it is desirable that a point or line on the grinding wheel or machine tool always remain tangent to the desired finished surface of the workpiece because this arrangement will produce uniform surface finishes, uniform cutting forces on the cutting tool, and more accurate parts without elaborate corrections in pattern shape to compensate for geometric errors. Also, a constant relative surface speed between grinding wheel and work is maintained when the tangent condition is maintained. This tangent condition is exemplified in the arrangement shown in FIGURE 1 by the grinding wheel 14 which may have a semi-circular cross section at its grinding surface as shown, or which may have a flat cross section at its grinding surface. The radius of the semicircular cross section of the grinding wheel 14 may be made equal to the radius of the tracing stylus 56 so that engagement and orientation of the tracing stylus 56 with respect to the pattern 60 corresponds identically with engagement and orientation of the grinding wheel 14 with the workpiece 10. In FIGURE 1, it will be seen that the same point on the grinding wheel 14 may be kept tangent to the desired finished surface on the workpiece 10 if the grinding wheel 14 is pivoted about its pivot point 26. In accordance with the invention, this pivoting about the pivot point 26 is attained along with the desired and necessary motion in the X and Y directions.

FIGURE 2(a) shows a schematic block diagram of an electrical system in accordance with the invention which is intended to be used in the arrangement shown in FIGURE 1. In FIGURE 2(a), the mechanical structure including the ways 36, 42, the carriage 34, the lead screws 38, 44 and other elements have been illustrated schematically together in a single block as indicated. The X and Y motions of this structure are provided by the X and Y motors 40, 46 which are mechanically coupled to the elements as indicated by the dashed lines. Signals for directing or driving the X and Y motors 40, 46 are derived from the tracing device 50 in a manner taught by Branson in the above identified patent. However, this operation will be reviewed briefly. The tracing device 50 is arranged to produce two inductive bridge arms positioned along the arbitrarily indicated X and Y axes which lie in a common plane and which are mutually perpendicular to each other. These bridge arms are excited by suitable alternating current voltages which are preferably related in phase to each other by an angle of 90 degrees as indicated in FIGURE 2(a). Alternatively, as taught by Branson, the voltages applied to the respective bridge arms may be in phase, and when derived from the bridge arms may be shifted in phase to provide a relative phase angle of 90 degrees. Any deflection of the tracing stylus 56 causes an unbalance in one or both of these bridge arms, and a component voltage or voltages are produced. The respective magnitudes of the two X and Y voltages or signals are proportional to the magnitude of deflection along their respective axes. Their phases are respectively proportional to the direction of their respective deflections. These two X and Y signals appear on X and Y leads and are combined in an adder circuit 70 which provides a single signal having a phase and magnitude dependent upon the respective phases and magnitudes of the component X and Y signals. The adder circuit 70 is coupled to a dephaser 72 which serves to introduce a phase component into the resultant signal provided by the adder circuit 70. This phase component depends upon the amount of deflection on the tracing stylus 56. As also explained by Branson, the function of the dephaser 72 is to provide a signal which causes motion such that the magnitude of deflection remains substantially constant. Thus, if the tracing stylus 56 is deflected more than a predetermined amount (called the index point), a component is introduced into the resultant signal that tends to cause the tracing stylus 56 to be moved away from the pattern 60. Conversely, if the tracing stylus 56 is deflected less than a predetermined amount, a component is introduced into the resultant signal that tends to cause the tracing stylus 56 to be moved closer to the pattern 60. The resultant signal from the dephaser 72 is applied to X and Y phase discriminators 74, these discriminators 74 providing two direct current signals. Each of these signals has a magnitude which, when amplified by X and Y amplifiers 76, 78, serves to cause the respective X and Y motors 40, 46 to be moved at a desired speed and in a desired direction. These speeds and directions maintain the desired tracing stylus deflection to cause a motion tangential to the pattern and workpiece. Movement of the X and Y motors, 40, 46 causes a corresponding movement of the structure so that the tracing stylus 56 follows the outline or configuration of the pattern 60. As the tracing stylus 56 so moves, the grinding wheel 14 which is mechanically or physically linked thereto moves along a similar path to grind the workpiece 10 to the same configuration.

In order that the grinding wheel 14 or other machine tool can be pivoted to provide the desired orientation with relation to the workpiece 10, the invention provides and uses a signal indicative of the desired orientation of the tracing stylus 56 with respect to the surface of the pattern 60 with which it is engaged. If, for example, it is desired that a particular point or surface of the grinding wheel 14 nearest the workpiece 10 engage or grind the workpiece 10, a signal is provided which causes the pivot arm 20 to pivot or rotate to provide this engagement. The tracing device 50 comprises arbitrarily designated and mutually perpendicular X and Y axes on which the respective bridge arms are oriented. One of these two axes is arbitrarily selected to serve as a reference for indicating the orientation of the tracing device 50 with respect to the engaged surface of the pattern 60. If this arbitrarily selected axis is maintained parallel to a tangent at the point of engagement between the tracing stylus 56 and the surface of the pattern 60, there will be no deflection of the tracing stylus 56 along this axis. In FIGURE 1, the Y axis of the tracing device has been arbitrarily selected as the reference axis. This Y axis, as well as the X axis is, represented by the dashed and dotted lines shown passing through the center of the tracing stylus 56. With the tracing device 50 and the tracing stylus 56 oriented as shown in FIGURE 1 (i.e., with the Y axis parallel to the tangent at the point of engagement between the tracing stylus 56 and the pattern 60), the only deflection present is along the X axis which is perpendicular to the Y axis. Thus, the only motion called for is that motion called for by deflection in the X axis direction. As taught by Branson, this deflection in the X axis direction produces a motion in a direction perpendicular to the axis of deflection, which motion would be in the Y direction. However, when there is any component of deflection along the Y axis, a signal will be produced by the bridge arm associated wtih it. This signal is utilized to produce motion in a direction perpendicular to the Y axis. This signal is also utilized in accordance with the invention to provide a twist or pivoting of the tracing device 50. As shown in FIGURE 2(a), this signal is derived from the Y axis lead and applied to a conventional amplitude discriminator 80. Such an amplitude discriminator 80 is known in the art, and is used to product a D.C. signal having a magnitude proportional to the rms value of the A.C. input signal. The polarity of the D.C. signal reverses when the A.C. signal reverses its phase 180 degrees. A description of an amplitude discriminator is given by Ahrendt in "Servomechansim Practice," McGraw-Hill Book Company, Inc., 1954, beginning at page 75. Signals from the amplitude discriminator 80 are applied to a twist amplifier 82 which amplifies and converts the signals into suitable signals for operating the twist motor 32. As shown in FIGURE 2(a), the twist motor 32 is mechanically coupled to the link 58 as indicated by the dashed lines. As long as some amplitude of signal from the Y axis bridge is present (this signal indicating deflection along the Y axis), the twist amplifier 82 will produce a signal calling for motion of the twist motor 32. The Y deflection signal not only has a magnitude indicative of the amount of deflection, but also has a phase indicative of the direction of deflection. This phase is utilized by means of the amplitude discriminator 80 and twist amplifier 82 causes the twist motor 32 to operate and orient the tracing device 50 and the grinding wheel 14 in the desired position. Once the resired orientation and position are reacted, the Y deflection signal falls to zero and no further twisting or pivoting is called for. Hence, the only remaining deflection present in the tracing device 50 is along the X axis, and this deflection causes motion in a direction perpendicular to the X axis or along a tangent to the surface of the pattern 60.

FIGURE 2(b) shows a block diagram of another electrical circuit which can be used with the embodiment shown in FIGURE 1. The circuitry shown in FIGURE 2(b) for providing the X and Y motions is identical to that shown in FIGURE 2(a). One difference between the two figures lies in the circuit from which the signal calling for pivoting or orientation is derived. Instead of deriving this signal from the Y lead at a point ahead of the adder circuit 70, this signal is derived from the output circuit of one of two adder circuits 70, 70' by means of a movable switch 71. These adder circuits 70, 70' produce a single signal having a magnitude indicative of the amount of deflection and a phase indicative of the direction of deflection. This signal is applied to a phase shift circuit 90 so that the total phase shift between the signal at the input to the phase discriminator 92 and the signal at the input of the phase shift circuit 90 may be adjusted to orient the wheel 14 and the tracing device 50 so that the cutting surface of the wheel 14 may be made tangent to the pattern 60 or workpiece 10 when the output of the discriminator 92 is reduced to null volts D.C. A total phase shift of 90 degrees is desired because this will result in the generally preferred orientation of the grinding wheel 14. The signal from the phase shift circuit 90 is applied to a phase discriminator circuit 92 along with a reference signal which has the same phase as the signal applied to the Y axis bridge of the tracing device 50. Thus, the signal from the phase shift circuit 90 is compared with a signal having the phase of the signal applied to the Y axis so that any difference in phase between the two signals represents the deflection of the tracing stylus 56 along the Y axis. The phase discriminator 92 produces an output signal having a magnitude and polarity indicative of the phase relationship of the two signals. This signal is applied to a twist amplifier 82 which amplifies and converts this signal to one suitable for operating the twist motor 32. Thus, pivoting or twisting of the tracing device 50 and the grinding wheel 14 is attained as explained in connection with FIGURE 2(a).

If the signals applied to the phase shift circuit 90 are derived from the adder circuit 70, pivoting or twisting of the tracing device 50 and the grinding wheel 14 bears a direct relationship with the amount of deflection of the tracing stylus 56 along the Y axis. However, if the signals for the phase shift circuit 90 are derived from the adder circuit 70', the sensitivity of the pivoting portion of the arrangement shown in FIGURE 2(b) can be changed by an adjustment of the adder circuit 70' to vary the ratio between the voltage per mil deflection of the tracing stylus 56 along the Y axis and between the voltage per mil deflection of the tracing stylus 56 along the X axis. If the signals indicative of these deflections are equally utilized (i.e., represent the same volts per mil deflection), the output of the adder circuit 70' produces a signal having a vector sum whose amplitude is directly proportional to the amount of deflection of the tracing stylus 56 and whose phase angle is a direct measure of the angle of deflection of the tracing stylus 56. If, however, the volts per mil of deflection of the tracing stylus 56 for the X excited axis is greater than the volts per mil of deflection of the tracing stylus 56 for the Y excited axis, the signal obtained at the output of the adder circuit 70' would have more electrical phase shift than the actual mechanical angular displacement of the tracing stylus 56 from the Y excited axis. If the ratio of the volts per mil deflection of the tracing stylus 56 along the X excited axis to the volts per mil deflection of the tracing stylus 56 along the Y excited axis is very high, any angular deviation of the tracing stylus from the Y excited axis results in a large output signal by the phase discriminator 92.

There is a side effect obtained if the ratio of deflection is not unity. The effect of overdeflection of the tracing stylus 56 beyond its index point and deflection at a positive angular error with respect to the Y excited axis is to reduce the output of the discriminator 92 below that value obtained at the same angular error with no overdeflection. For an overdeflection of the tracing stylus 56 beyond the index point and a deflection at a negative angular error, the effect is to increase the output of the discriminator 92 above that value of output obtained at the same angular error with no overdeflection. The converse is true for underdeflection. This side effect is deliberately included to provide compensation for the joint effects of the geometry of the machine being controlled and the characteristics of the X and Y motion controls.

While the arrangement shown in FIGURE 1 and FIGURE 2(b) has been successfully built and operated, it does have certain limitations. For example, the amount of pivoting is limited to a relatively small angle in the neighborhood of 30 degrees because of the error introduced into the system by this pivoting. Thus, if the arrangement is pivoted by some amount such as shown in FIGURE 1, the Y axis of the tracing device 50 is at a considerable angle with respect to the Y direction of motion provided by the vertical lead screws 44. Thus, for a given deflection of the tracing stylus 56 along its Y axis, an increasingly greater error is introduced as the angle of the Y axis deviates more from the vertical Y motion provided by the vertical lead screws 44. The extreme error of such a situation would be present if the Y axis of the tracing device 50 were pivoted to a horizontal position (i.e., at an angle of 90 degrees with respect to the Y direction of motion provided by the vertical lead screws 44). In other words, if the Y axis of the tracing device 50 were horizontal, a deflection along this Y axis would provide resultant motion which would be vertical when actually it should be horizontal. Thus, the limitations of the arrangements shown in FIGURE 1 will be appreciated.

An arrangement which eliminates the error just mentioned is shown in the embodiment of FIGURE 3. In FIGURE 3, only the grinding wheel 14 is shown, the grinding motor 22 and shaft 24 having been left out in the interest of clarity. The embodiment of FIGURE 3 not only serves to eliminate the error which may be present in the embodiment of FIGURE 1 but also utilizes two similar tracing devices 50, 50' and different pivot points for the grinding wheel 14. The individual functions of the two tracing devices 50, 50' will be explained. In the embodiment of FIGURE 3, the pivot points for the tracing devices 50, 50' and the grinding wheel 14 are respectively placed at the center of the tracing stylii 56, 56' and at the point of the grinding wheel 14 which corresponds to the center of the tracing styli 56, 56'. For the grinding wheel 14, this point would be at the center of the semicircular surface of the grinding wheel 14. Respective patterns 60, 60' are provided for the two tracing devices 50, 50'. The workpiece 10, the patterns 60, 60' the grinding wheel 14, and the tracing devices 50, 50' are all positioned with relation to each other so that the respective pivot points of the grinding wheel 14 and the two tracing devices 50, 50' are correspondingly located with respect to the workpiece 10 and patterns 60, 60'. In the embodiment of FIGURE 3, the twist motor 32, the worm wheel and gear 28, 30, the grinding wheel 14, its associated motor 22 and shaft 24, and the two similar tracing devices 50, 50' are all mounted on a structure 98 which is suspended from and supported by the carriage 34. The structure 98 is moved in the X and Y directions by the arrangement described in connection with the carriage 34. Further, the structure 98 moves only in the X and Y directions and does not pivot. One of the tracing devices 50' is mechanically or suitably connected to the grinding wheel 14 and the worm wheel 28 by a link 59 shown as a dashed line. This link 59 causes the tracing device 50' to simultaneously pivot or rotate through the same angle as do the worm wheel 28 and the grinding wheel 14.

The two tracing devices 50, 50' and their associated patterns 60, 60' are provided to eliminate the error introduced by the single tracing device 50 shown in FIGURE 1 being pivoted when movement in the X and Y directions takes place. Thus, deflections of the first tracing device 50 serves to provide motion in the X and Y directions, while deflections of the second tracing device 50' serve to provide pivoting or rotation of only the second tracing device 50' and the grinding wheel 14. However, the second tracing device 50' and all of the other elements carried on the structure 98 move in the X and Y directions as determined by the first tracing device 50.

FIGURE 4(a) shows a schematic block diagram of a circuit which can be used with the embodiment of FIGURE 3. In FIGURE 4(a) the first tracing device 50 is utilized with the same circuitry shown in FIGURE 2(a) to provide motion in the X and Y directions. The second tracing device 50' is utilized to provide pivoting of the second tracing device 50' and the worm wheel 28 and grinding wheel 14. In FIGURE 4(a), it has been arbitrarily assumed that the Y axis of the second tracing device 50' will indicate the amount of pivoting desired or called for. Hence only the bridge arm associated with the Y axis need be excited. If the Y axis of the second tracing device 50' is parallel to a tangent at the point of contact between the tracing stylus 56' and the pattern 60', there will be no deflection of the tracing stylus 56' along this Y axis. This can be understood from an examination of the Y axis shown for the second tracing device 50' in FIGURE 3. However, if there is any deflection of the tracing stylus 56' along this Y axis, this deflection indicates that the Y axis is not parallel to a tangent at the point of engagement of the tracing stylus 56' and the pattern 60'. This deflection produces a signal having an amplitude that indicates the magnitude of the angle between the Y axis and the tangent at the point at which the tracing stylus 56' engages the pattern 60'. This signal is applied to a conventional amplitude discriminator 80 such as explained in connection with FIGURE 2(a) and which produces a signal having a polarity indicative of the direction of error and a magnitude proportional to the size of the angular error. The signal from the amplitude discriminator 80 is applied to the twist amplifier 82 which amplifies and converts this signal to one which can be used to operate the twist motor 32 to a degree and in a direction such that the Y axis of the second tracing device 50' becomes parallel to the tangent at the point of engagement between the second tracing device 50' and the pattern 60'. Once the desired orientation is reached, the amplitude of the signal from the amplitude discriminator 80 falls to zero and no further action is produced by the twist motor 32.

FIGURE 4(b) shows another schematic block diagram of an electrical circuit which can be used in connection with the embodiment of FIGURE 3. In the circuit of FIGURE 4(b), the X and Y motions are provided in the same manner and with the same circuitry as shown in FIGURE 4(a). And, in FIGURE 4(b) the same first and second tracing devices 50, 50' are utilized. However, different circuitry is provided for the second tracing device 50'. In FIGURE 4(b), both bridge arms of the second tracing device 50' are respectively excited with signals. The signals produced by the second tracing device 50' are combined in an adder circuit 70 to produce a single signal having a phase and magnitude indicative of the direction and magnitude of deflection of the tracing stylus 56'. This single signal is applied to the phase shift circuit 90 which produces a phase shift of the signal such that it is related by zero degrees with respect to the signal applied to the Y axis bridge arm of the second tracing device 50'. This signal is applied to a phase discriminator 74' to which a reference signal is also applied, the reference signal being of the same phase as the excitation signal of the Y bridge arm. The phase discriminator 74' combines these two signals to produce a direct current signal having a polarity and magnitude indicative of the relative phase. This direct current signal is applied to a twist amplifier 82 where it is amplified and then applied to the twist motor 32 which provides the desired pivoting or twisting of the grinding wheel 14 and the second tracing device 50'.

FIGURE 5 shows still another embodiment of the invention which also eliminates the error introduced by the embodiment of FIGURE 1. The embodiment of FIGURE 5 is similar to that shown in FIGURE 3, the major difference being that a resolver 100 is substituted for the second tracing device 50'. A resolver such as shown in FIGURE 5 is known in the art and is described beginning at page 46 of the previously mentioned book by Ahrendt. Such a resolver, when excited in quadrature, produces an A.C. output voltage that has an electrical phase angle equal to its mechanical shaft angle. The resolver shaft is oriented with respect to the grinding wheel 14 and worm wheel 28 so that the grinding wheel surface will be positioned tangent with respect to the pattern surface and workpiece when the resolver A.C. output phase angle is zero or 180 degrees out of phase to the phase angle from the tracing device after the X and Y signals are combined in the adder circuit 70. The purpose of the resolver 100 is to provide a signal indicative of the angular rotation of the resolver 100 from some predetermined axis. Thus, the resolver 100 is coupled to the grinding wheel 14 and the worm wheel 28 by a link 59 indicated by dashed lines so that the resolver 100 and the grinding wheel 14 and worm wheel 28 rotate simultaneously and through the same angle. The coupling between the grinding wheel 14 and the worm wheel 28 is not shown. In FIGURE 5, it will also be noted that a worm wheel 28 of 360 degrees is provided instead of the worm wheel of 180 degrees shown in FIGURE 3. Thus, the embodiment of FIGURE 5 can pivot through 360 degrees. However, it is to be understood that the embodiment of FIGURE 3 may also pivot through 360 degrees if provided with a worm wheel 28 of 360 degrees. The embodiment of FIGURE 5 utilizes the same first tracing device 50 in conjunction with a pattern or template 60 to provide motion in the X and Y directions as it did in the embodiment of FIGURE 3.

FIGURE 6 shows a schematic block diagram of an electrical circuit which can be used with the embodiment shown in FIGURE 5. In FIGURE 6 the same components and elements are used in connection with the first tracing device 50 to provide motion in the X and Y directions through the X and Y motors 40, 46. As mentioned, the resolver 100 provides an electrical signal having a phase indicative of its rotation from some arbitrary axis. The resolver 100 is supplied with two quadrature signals having a phase relationship of 90 degrees as indicated. Its output signal has a phase angle indicative of the angle of rotation from an arbitrary axis and is applied to a phase discriminator 102. The phase discriminator 102 utilizes the signal supplied by the resolver 100 and the signal supplied by the added circuit 70. The adder circuit signal is amplified by a conventional amplifier 104 and clipped or limited by a clipper circuit 106 to provide a signal that has a phase which is the same as the phase of the signal from the adder circuit but which has a constant amplitude as provided by the amplifier and clipper circuits 104, 106. The two signals are compared in the phase discriminator circuit 102 and a D.C. signal is produced which is indicative of the relative phase relationship of these two signals. The phase discriminator 102 may be similar to the phase discriminators 74 described previously. The signal from the phase discriminator 102 is suitably amplified by a twist amplifier 82 and applied to the twist motor 32 to provide the desired pivoting of the grinding wheel 14 and the resolver 100. Since the deflection of the tracing stylus 56 of the first tracing device 50 provides a signal having a phase related to the direction of deflection, the phase of this signal may be compared with the phase of the signal from the resolver 100 to provide a signal indicative of the orientation of the resolver 100 and the grinding wheel 14 with relation to the pattern 60'. And, when the two phases have a predetermined relationship, this relationship can be used to indicate that the grinding wheel 14 has the orientation needed to provide the desired tangential relationship between the grinding wheel 14 and the workpiece 10.

Persons skilled in the art will appreciate that modifications can be made in the embodiment illustrated in the drawing and explained in the specification. However, it is to be understood that such modifications may be made by persons skilled in the art without departing from the spirit of the invention or from the scope of the claims.

What we claim as new and desire to secure by Letters Patent of the United States is:

1. A control system for moving and orienting a pivotable device in a desired direction and with a desired orientation, comprising a tracing device for generating a first signal indicative of said desired direction of movement of said pivotable device, first means coupled to said tracing device and adapted to be coupled to said pivotable device for moving said pivotable device in said desired direction in response to said first signal, second means for generating a second signal indicative of said desired orientation of said pivotable device, and means coupled to said second means and adapted to be coupled to said pivotable device for orienting said pivotable device in said desired orientation in response to said second signal.

2. A control system comprising a pivotable device which is to be moved in a desired direction and pivoted to a desired orientation, a tracing device for generating a first signal indicative of said desired direction of movement of said pivotable device, first means coupled to said tracing device and to said pivotable device for moving said pivotable device in said desired direction in response to said first signal, second means for generating a second signal indicative of said desired orientation of said pivotable device, and means coupled to said second means and to said pivotable device for pivoting said pivotable device to said desired orientation in response to said second signal.

3. A control system for a pivotable device which is to be moved in a desired direction and pivoted to a desired orientation, comprising a tracing device for generating a first signal indicative of said desired direction of movement of said pivotable device, first means coupled to said tracing device and adapted to be coupled to said pivotable device for moving said pivotable device in said desired direction in response to said first signal, second means for generating a second signal indicative of the actual orientation of said pivotable device, and means coupled to said second means and adapted to be coupled to said pivotable device for pivoting said pivotable device to said desired orientation in response to said second signal.

4. A control system comprising a pivotable device which is to be moved in a desired direction and pivoted to a desired orientation, a tracing device for generating a first signal indicative of said desired direction of movement of said pivotable device, first means coupled to said tracing device and to said pivotable device for moving said pivotable device in said desired direction in response to said first signal, second means for generating a second signal indicative of the actual orientation of said pivotable device, and means coupled to said second means and to said pivotable device for pivoting said pivotable device to said desired orientation in response to said second signal.

5. A control system for a pivotable device which is to be moved in a desired direction and pivoted to a desired orientation, comprising a first tracing device for generating a first signal indicative of said desired direction of movement of said pivotable device, first means coupled to said first tracing device and adapted to be coupled to said pivotable device for moving said pivotable device in said desired direction in response to said first signal, a second tracing device for generating a second signal indicative of said desired orientation of said pivotable device, and second means coupled to said second tracing device and adapted to be coupled to said pivotable device for pivoting said pivotable device to said desired orientation in response to said second signal.

6. A control system comprising a pivotable device which is to be moved in a desired direction and pivoted to a desired orientation, a first tracing device for generating a first signal indicative of said desired direction of movement of said pivotable device, first means coupled to said first tracing device and to said pivotable device for moving said pivotable device and said first tracing device in said desired direction in response to said first signal, a second tracing device for generating a second signal indicative of said desired orientation of said pivotable device, and second means coupled to said second tracing device and to said pivotable device for pivoting said pivotable device and said second tracing device to said desired orientation in response to said second signal.

7. A control system for a pivotable device which is to be moved in a desired direction and pivoted to a desired orientation, comprising a tracing device for generating a first signal indicative of said desired direction of movement and indicative of said desired orientation of said pivotable device, first means coupled to said tracing device and adapted to be coupled to said pivotable device for moving said pivotable device in said desired direction in response to said first signal, second means for generating a second signal indicative of the orientation of said pivotable device, third means coupled to said second means and to said tracing device for comparing said first and said second signals and producing a pivot signal, and fourth means coupled to said third means and adapted to be coupled to said pivotable device for pivoting said pivotable device to said desired orientation in response to said pivot signal.

8. A control system comprising a pivotable device which is to be moved in a desired direction and pivoted to a desired orientation, a tracing device for generating a first signal indicative of said desired direction of movement and indicative of said desired orientation of said pivotable device, first means coupled to said tracing device and to said pivotable device for moving said pivotable device and said tracing device in said desired direction in response to said first signal, second means for generating a second signal indicative of the orientation of said pivotable device, third means coupled to said second means and to said tracing device for comparing said first and said second signals and producing a pivot signal indicative of the relative values of said first signal and said second signal, and fourth means coupled to said second means, to said third means, and to said pivotable device for pivoting said pivotable device and said second means to said desired orientation in response to said pivot signal.

References Cited in the file of this patent
UNITED STATES PATENTS

| | | |
|---|---|---|
| 2,410,295 | Kuehni et al. | Oct. 29, 1946 |
| 2,477,135 | Marker et al. | July 26, 1949 |
| 2,492,731 | Branson | Dec. 27, 1949 |

UNITED STATES PATENT OFFICE
CERTIFICATE OF CORRECTION

Patent No. 3,062,996                      November 6, 1962

Glenn G. Ertell et al.

It is hereby certified that error appears in the above numbered patent requiring correction and that the said Letters Patent should read as corrected below.

Column 4, line 63, for "wtih" read -- with --; line 71, for "product" read -- produce --; column 5, line 17, for "resired" read -- desired --; line 18, for "reacted" read -- reached --; column 7, line 31, for "serves" read -- serve --.

Signed and sealed this 7th day of May 1963.

(SEAL)
Attest:

ERNEST W. SWIDER
Attesting Officer

DAVID L. LADD
Commissioner of Patents